(12) United States Patent
Koide et al.

(10) Patent No.: US 8,825,309 B2
(45) Date of Patent: Sep. 2, 2014

(54) CARGO HANDLING CONTROLLER FOR CARGO HANDLING VEHICLE

(75) Inventors: Yukikazu Koide, Kariya (JP); Norihiko Kato, Kariya (JP)

(73) Assignee: Kabushiki Kaisha Toyota Jidoshokki, Aichi (JP)

( * ) Notice: Subject to any disclaimer, the term of this patent is extended or adjusted under 35 U.S.C. 154(b) by 715 days.

(21) Appl. No.: 12/943,567

(22) Filed: Nov. 10, 2010

(65) Prior Publication Data

US 2011/0112712 A1 May 12, 2011

(30) Foreign Application Priority Data

Nov. 12, 2009 (JP) .................................. 2009-258739

(51) Int. Cl.
  *G06G 7/70* (2006.01)
  *B60K 6/485* (2007.10)
  *B60W 10/08* (2006.01)
  *B60W 10/06* (2006.01)

(52) U.S. Cl.
  USPC ............. 701/50; 701/22; 701/99; 180/65.285

(58) Field of Classification Search
  USPC .................. 701/50, 22, 99; 180/65.21, 65.26, 180/65.275, 65.285; 60/412, 420, 426, 609, 60/413, 484
  See application file for complete search history.

(56) References Cited

U.S. PATENT DOCUMENTS

| 6,315,068 | B1 * | 11/2001 | Hoshiya et al. | 180/65.25 |
| 7,464,778 | B2 * | 12/2008 | Kato et al. | 180/65.245 |
| 2004/0043863 | A1 | 3/2004 | Kondo et al. | |
| 2008/0257323 | A1 * | 10/2008 | Sugimoto | 123/625 |

FOREIGN PATENT DOCUMENTS

| JP | 2001-173024 A | 6/2001 |
| JP | 2002-048227 A | 2/2002 |
| JP | 2003-252588 A | 9/2003 |
| JP | 2004-084830 A | 3/2004 |
| JP | 2005-207386 A | 8/2005 |
| JP | 2005-298163 A | 10/2005 |
| JP | 2006-273515 A | 10/2006 |
| JP | 2006-273516 A | 10/2006 |
| JP | 2009-040547 A | 2/2009 |

* cited by examiner

*Primary Examiner* — Christine Behncke
(74) *Attorney, Agent, or Firm* — Sughrue Mion, PLLC

(57) ABSTRACT

A cargo handling controller includes a rotation speed setting unit, an engine control unit, a memory, a rotation speed detection unit, a deviation calculator, an assistance amount setting unit, and a generator-motor control unit. The deviation calculator calculates a deviation of a feedback control rotation speed, which is determined from a target engine rotation speed stored in the memory a predetermined time earlier, and an actual rotation speed of the generator-motor, which is detected by the rotation speed detection unit. The assistance amount setting unit obtains a generator-motor assistance amount in accordance with the deviation. The generator-motor control unit sends a drive signal that is in accordance with the generator-motor assistance amount to the generator-motor.

6 Claims, 6 Drawing Sheets

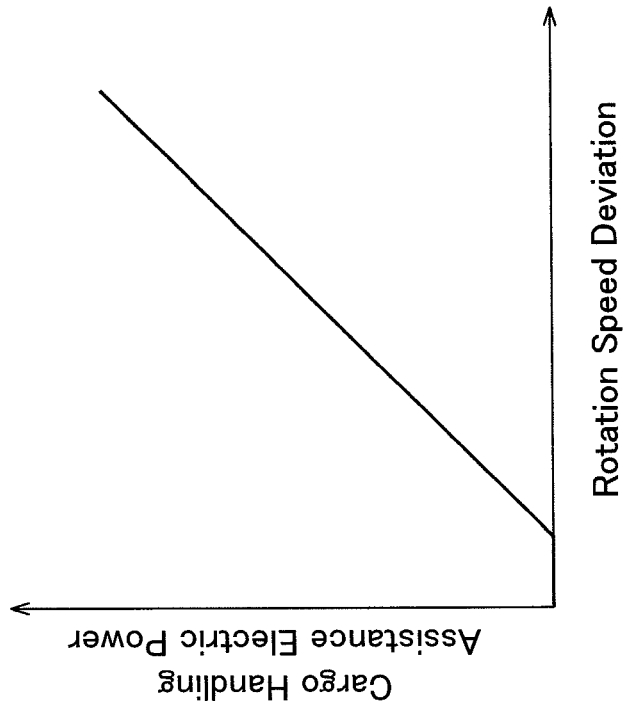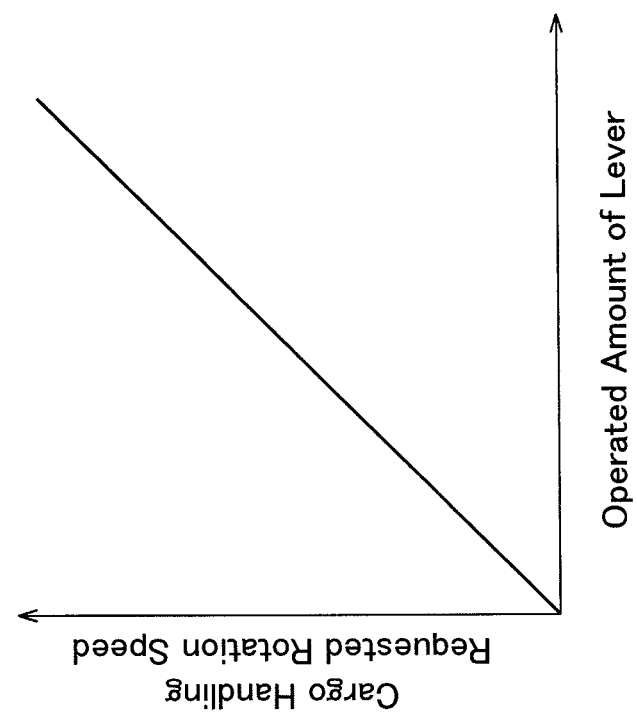

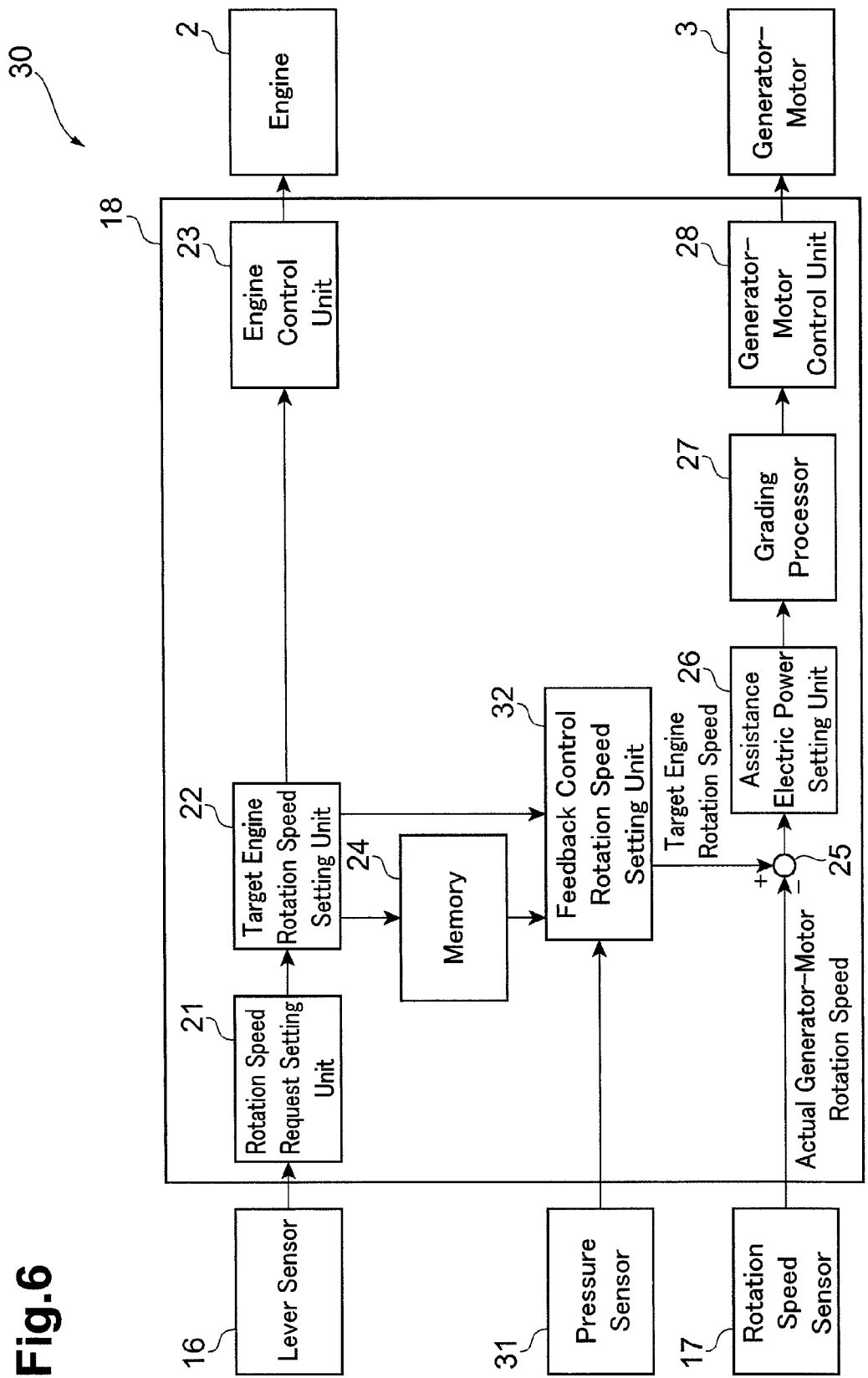

CARGO HANDLING CONTROLLER FOR CARGO HANDLING VEHICLE

BACKGROUND OF THE INVENTION

Japanese Laid-Open Patent Publication No. 2005-298163 describes a prior art example of a cargo handling controller for a cargo handling vehicle. The cargo handling vehicle includes an engine, a generator-motor, and a cargo handling pump, which are arranged so as to be coaxial to one another. The cargo handling vehicle switches the operation modes of the generator-motor between generator mode and motor mode. More specifically, when a cargo handling operation does not require a high output, the generator-motor is switched to the generator mode, and the pump is driven by the engine. When a cargo handling operation requires a high output, the generator-motor is switched to the motor mode, and the generator-motor assists the engine in driving the pump.

Japanese Laid-Open Patent Publication No. 2001-173024 discloses a construction machine including an engine, a rotary electrical device (generator-motor), and a hydraulic pump, which are arranged so as to be coaxial to one another. The rotary electrical device is operated as a generator and a motor. More specifically, the rotary electrical device is operated as a generator when an operational angle of an operation lever is less than or equal to a predetermined angle. The rotary electrical device is operated as a motor when the operational angle of the operation lever is greater than the predetermined angle. A drive command is output so as to control the output of the rotary electrical device in accordance with the operational angle of the operation lever. Further, when there is a decrease in the speed of the rotation produced by the engine (engine rotation speed), the construction machine operates the rotary electrical device as a motor and feedback controls the rotary electrical device based on the engine rotation speed.

In the construction machine, the output of the rotary electrical device is controlled based on the comparison of a target engine rotation speed and an actual engine rotation speed. However, in an electric power generation system (engine to generator-motor), there is normally a long delay until the actual rotation responds to a drive command. Thus, the present actual engine rotation speed would be the result of a response to a target engine rotation speed that was given a predetermined time earlier. Accordingly, in a feedback control system that compares the present target engine rotation speed and the present actual engine rotation speed, response delays may result in excessive or insufficient corrections. This may cause the cargo handling assistance amount of the generator-motor to be excessive or insufficient and consequently lower the cargo handling capacity.

SUMMARY OF THE INVENTION

It is an object of the present invention to provide a cargo handling controller for a cargo handling vehicle in which a generator-motor performs cargo handling assistance in a desirable manner.

One aspect of the present invention is a cargo handling controller for a cargo handling vehicle including an engine, a generator-motor, a pump arranged coaxially with the engine and the generator-motor, a cargo handling actuator driven by operational oil from the pump, and an operation unit that drives and operates the cargo handling actuator. The cargo handling controller includes a rotation speed setting unit that obtains a target engine rotation speed in accordance with an operated amount of the operation unit. An engine control unit sends a drive signal that is in accordance with the target engine rotation speed to the engine. A memory stores the target engine rotation speed. A rotation speed detection unit detects an actual rotation speed of the generator-motor. A deviation calculator calculates a deviation of a feedback control rotation speed, which is determined from the target engine rotation speed stored in the memory a predetermined time earlier, and an actual rotation speed of the generator-motor, which is detected by the rotation speed detection unit. An assistance amount setting unit obtains a generator-motor assistance amount in accordance with the deviation. A generator-motor control unit that sends a drive signal that is in accordance with the generator-motor assistance amount to the generator-motor.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3A is a cargo handling request rotation speed map used by a cargo handling rotation speed setting unit shown in FIG. 1;

FIG. 3B is a graph showing a cargo handling assistance electric power map used by an assistance electric power setting unit shown in FIG. 2;

FIG. 6 is a block diagram showing a cargo handling controller according to a second embodiment of the present invention.

DETAILED DESCRIPTION OF THE PREFERRED EMBODIMENTS

A first embodiment of the present invention will now be described in detail with reference to the drawings.

Figure 1:
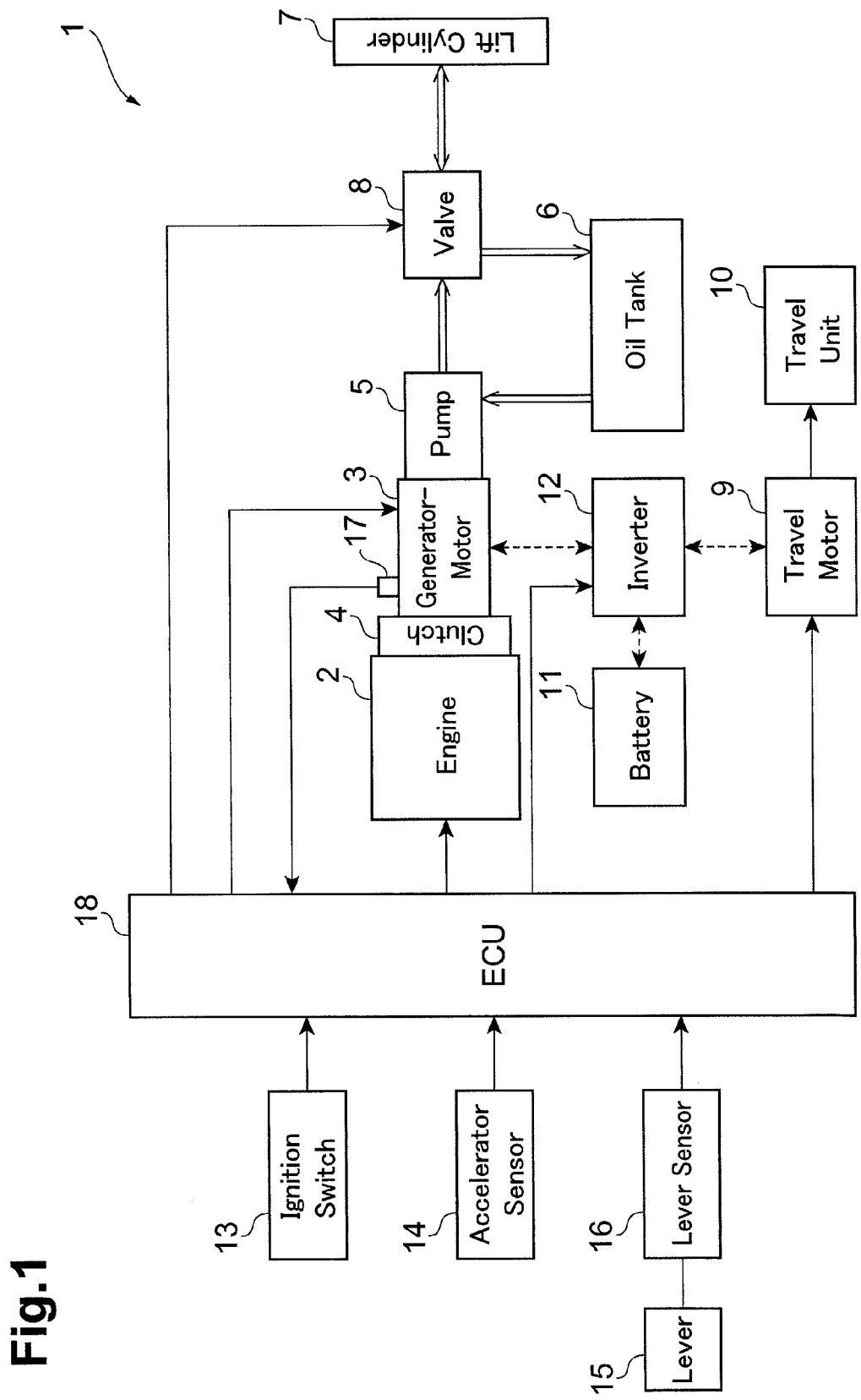
FIG. 1 is a schematic block diagram showing the structure of a hybrid forklift including a cargo handling controller according to a first embodiment of the present invention.

Referring to FIG. 1, a hybrid forklift 1, which serves as a cargo handling vehicle, includes an engine 2, a generator-motor 3, and a clutch 4. The engine 2 includes a mechanical or electronic governor (not shown). The generator-motor 3 is coaxially connected by a drive shaft (not shown) to the engine 2. The clutch 4 is arranged between the engine 2 and the generator-motor 3.

The generator-motor 3 operates in the generator mode as a generator, which is rotated and driven by the engine 2 to generate power. Further, the generator-motor 3 operates in the motor mode as a motor. The operation mode of the generator-motor 3 is selected by a mode switching signal, which is provided by an ECU 18.

The forklift 1 includes a cargo handling pump 5, an operational oil tank 6, a lift cylinder (cargo handling actuator) 7, and a cargo handling valve 8. The pump 5 is coaxially connected by a drive shaft (not shown) to the engine 2 and the generator-motor 3. The operational oil tank 6 is connected to the cargo handling pump 5. The lift cylinder 7 lifts and lowers a fork (not shown). The valve 8 is arranged between the pump 5 and the lift cylinder 7.

The pump 5, which is driven by the engine 2 and the generator-motor 3, draws in operational oil from the operational oil tank 6 and discharges the oil. The oil discharged from the pump 5 drives the lift cylinder 7. In accordance with an open amount command signal from the ECU 18, the valve 8 controls the direction and the flow rate of the operational oil flowing between the pump 5 and the lift cylinder 7.

The forklift 1 includes a travel motor 9 and a travel unit 10. The travel unit 10 drives the forklift 1 when the forklift 1 travels.

Further, the forklift 1 includes a battery 11 and an inverter 12 (power converter), which is connected to the battery 11. The inverter 12 stores the electric power generated by the generator-motor 3 operating in the generator mode. The inverter 12 also supplies the generator-motor 3 and the travel motor 9 with power from the battery 11 when the generator-motor 3 and the travel motor 9 operate in the motor mode. The ECU 18 generates a mode switching signal and a drive command signal to control the charging and discharging of the battery 11.

The forklift 1 also includes an ignition switch 13, an accelerator depression amount sensor 14, a cargo handling lever 15, a lever sensor 16, a rotation speed sensor 17 (rotation speed detection unit), and the ECU (electronic control unit) 18. The ignition switch 13 is used to start the engine 2. The accelerator depression amount sensor 14 detects the depressed amount of an accelerator. The rotation speed sensor 17 detects the speed of the rotation produced by the generator-motor 3. The lever 15 is a lift lever used to drive and operate the lift cylinder 7.

The ECU 18 controls the systems for the entire forklift 1. The ECU 18 receives an ON/OFF signal from the ignition switch 13 and detection signals from the accelerator depression amount sensor 14, the lever sensor 16, and the rotation speed sensor 17 to perform predetermined processes and send various signals to the engine 2, the generator-motor 3, the valve 8, the travel motor 9, and the inverter 12. More specifically, the ECU 18 sends drive command signals to the engine 2, the generator-motor 3, and the travel motor 9. The ECU 18 also sends an open amount command signal to the valve 8 in accordance with an operated amount (operational angle) of the cargo handling lever 15 and a mode switching signal to the inverter 12 in accordance with the generator mode and the motor mode. Further, the ECU 18 sends drive command signals to the generator-motor 3 and the travel motor 9.

Figure 2:
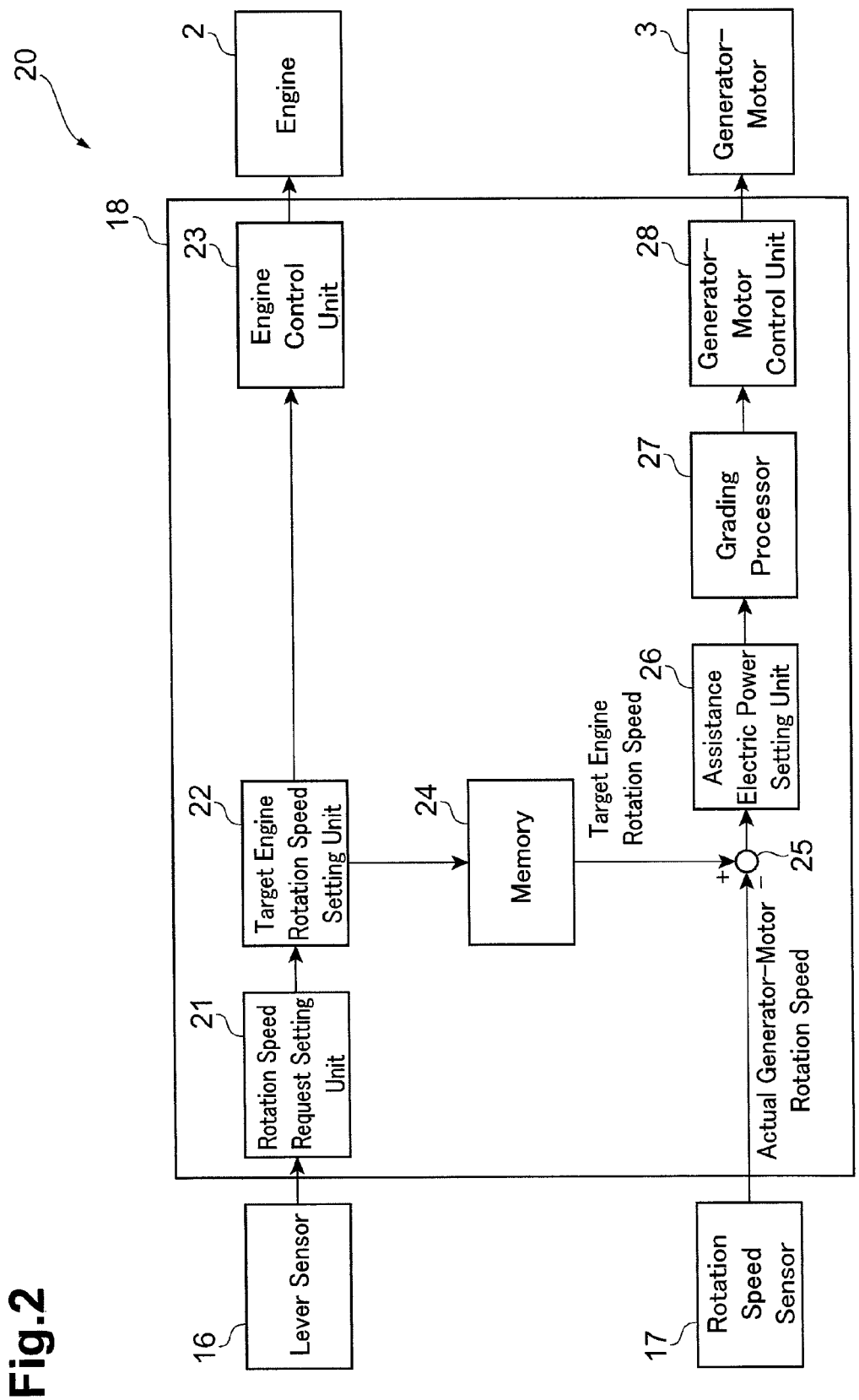
FIG. 2 is a block diagram of a functional block in an ECU shown in FIG. 1.

FIG. 2 is a block diagram of a cargo handling controller of the first embodiment and shows a functional block of the ECU 18 shown in FIG. 1. FIG. 2 shows the cargo handling controller in a state in which the generator-motor 3 is operated in the motor mode so that the generator-motor 3 assists the engine 2 in driving the pump 5. In the motor mode, the clutch 4 is in a connected state.

As shown in FIG. 2, the cargo handling controller 20 of the first embodiment includes the lever sensor 16, the rotation speed sensor 17, and the ECU 18.

The ECU 18 includes a cargo handling request rotation speed setting unit 21, a target engine rotation speed setting unit 22, an engine control unit 23, a memory 24, a deviation calculation unit 25, an assistance electric power setting unit 26, a grading processor 27, and a generator-motor control unit 28.

The request rotation speed setting unit 21 sets the rotation speed (cargo handling request rotation speed) of the pump 5 required for a cargo handling operation. To obtain the cargo handling request rotation speed in accordance with the operated amount of the lever 15, the request rotation speed setting unit 21 uses, for example, the cargo handling request rotation speed map shown in FIG. 3A.

Figure 4:
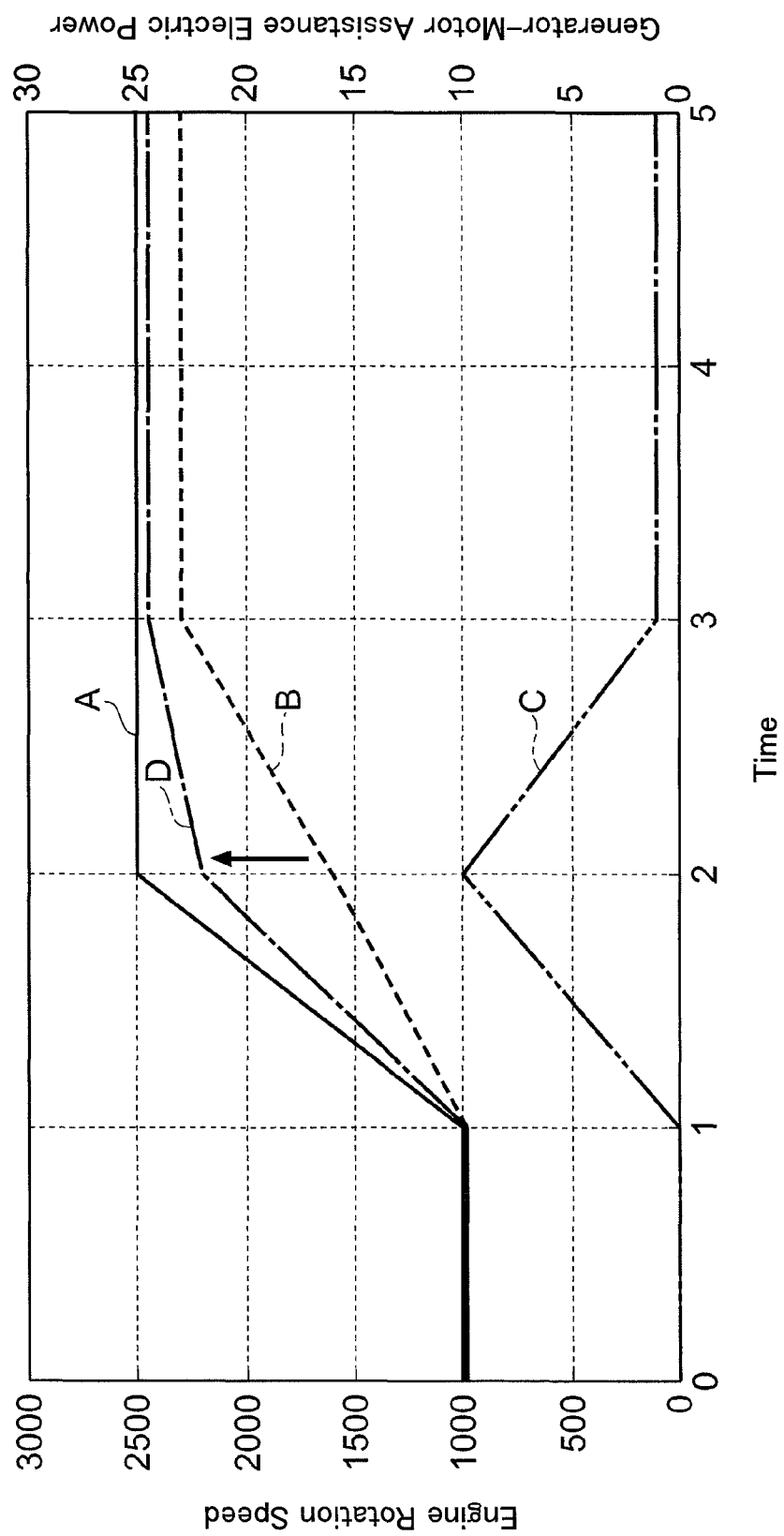
FIG. 4 is a graph showing one example of the relationship of the target engine rotation speed, actual engine rotation speed, and cargo handling assistance electric power.

The target engine rotation speed setting unit 22 obtains the engine rotation speed required for the engine 2 in accordance with the cargo handling request rotation speed obtained by the request rotation speed setting unit 21 (for example, refer to solid line A in FIG. 4).

The engine control unit 23 sends a drive command signal, which is in accordance with a target engine rotation speed obtained by the target engine rotation speed setting unit 22, to a throttle actuator (not shown) of the engine 2.

The memory 24 sequentially stores the target engine rotation speed obtained by the target engine rotation speed setting unit 22. A link buffer, for example, is used as a storage medium for storing the target engine rotation speed.

The deviation calculation unit 25 calculates the deviation of a feedback control rotation speed, which is obtained from the engine rotation speed command stored in the memory 24, and the actual rotation speed of the generator-motor 3 (actual generator-motor rotation speed), which is detected by the rotation speed sensor 17. The engine 2 and the generator-motor 3 are arranged co-axially. Thus, the actual rotation speed of the generator-motor 3 is equal to the actual rotation speed of the engine 2. This allows for the actual rotation speed of the engine 2 to be detected as the actual rotation speed of the generator-motor 3.

The cargo handling controller 20 uses the target engine rotation speed that was stored in the memory 24 a predetermined rotation speed and predetermined time earlier as a feedback control rotation speed. That is, the deviation calculation unit 25 calculates the deviation (rotation speed deviation) of the target engine rotation speed that was obtained a predetermined time earlier and the present (most recent) generator-motor actual rotation speed.

The assistance electric power setting unit 26 uses the cargo handling assistance electric power map shown in FIG. 3B, for example, to obtain the cargo handling assistance electric power that is in accordance with the rotation speed deviation calculated by the deviation calculation unit 25. To prevent an excessive increase in the power consumption of the battery 11, the assistance electric power map includes a dead zone in a range in which the rotation speed deviation is small.

The grading processor 27 performs a grading process on the cargo handling assistance electric power obtained by the assistance electric power setting unit 26. For example, when the cargo handling assistance electric power is varied in a stepped manner, the grading process smoothly varies the cargo handling assistance electric power (refer to double-dashed line C in FIG. 4). The grading process may be performed when the cargo handling assistance electric power obtained by the assistance electric power setting unit 26 is greater than or equal to a predetermined value.

The generator-motor control unit 28 sends a drive command signal to the generator-motor 3. The drive command signal is generated in accordance with the cargo handling assistance electric power that has undergone a grading process in the grading processor 27.

The cargo handling request rotation speed setting unit 21 and the target engine rotation speed setting unit 22 form a rotation speed setting unit, which obtains the target engine rotation speed in accordance with the operated amount of a cargo handling operation unit (cargo handling lever 15). The engine control unit 23 sends a drive signal that is in accordance with the target engine rotation speed to the engine 2. The memory 24 stores the target engine rotation speed. The rotation speed sensor 17 forms a rotation speed detection unit that detects the actual speed of the rotation produced by the generator-motor 3. The deviation calculation unit 25 calculates the deviation of the feedback control rotation speed, which is determined from the target engine rotation speed stored in the memory 24 a predetermined time earlier, and the actual rotation speed of the generator-motor 3, which is detected by the rotation speed sensor 17. The assistance electric power setting unit 26 and the grading processor 27 form an assistance amount setting unit that obtains a generator-motor assistance amount, which is in accordance with the deviation of the feedback control rotation speed and the actual rotation speed of the generator-motor 3. The generator-motor control unit 28 sends a drive signal that is in accordance with the generator-motor assistance amount to the generator-motor 3.

In the cargo handling controller 20, for example, when the target engine rotation speed is as shown by the solid line A in FIG. 4 and the generator-motor 3 does not perform cargo handling assistance even though a significantly high cargo handling load (full load) is applied to the lift cylinder 7 (fork), the actual rotation speed of the engine 2 is, for example, as shown by the broken line B in FIG. 4. In contrast, when the cargo handling assistance electric power is generated in accordance with the deviation of the engine command rotation speed and the generator-motor actual rotation speed, and the generator-motor 3 performs cargo handling assistance as shown, for example, by the double-dashed line C in FIG. 4, the actual rotation speed of the engine 2 approaches the target engine rotation speed as shown by the single-dashed line D in FIG. 4 (refer to the arrow in the drawing).

In this manner, the generator-motor 3 performs cargo handling assistance and increases the cargo handling capability. This allows for the engine 2 to have a reduced size and increased fuel efficiency. Further, the cargo handling assistance electric power is determined by calculating the deviation of the target engine rotation speed and the actual generator-motor rotation speed. Thus, additional components for detecting and estimating the cargo handling load are not necessary. This lowers costs.

Figure 5:
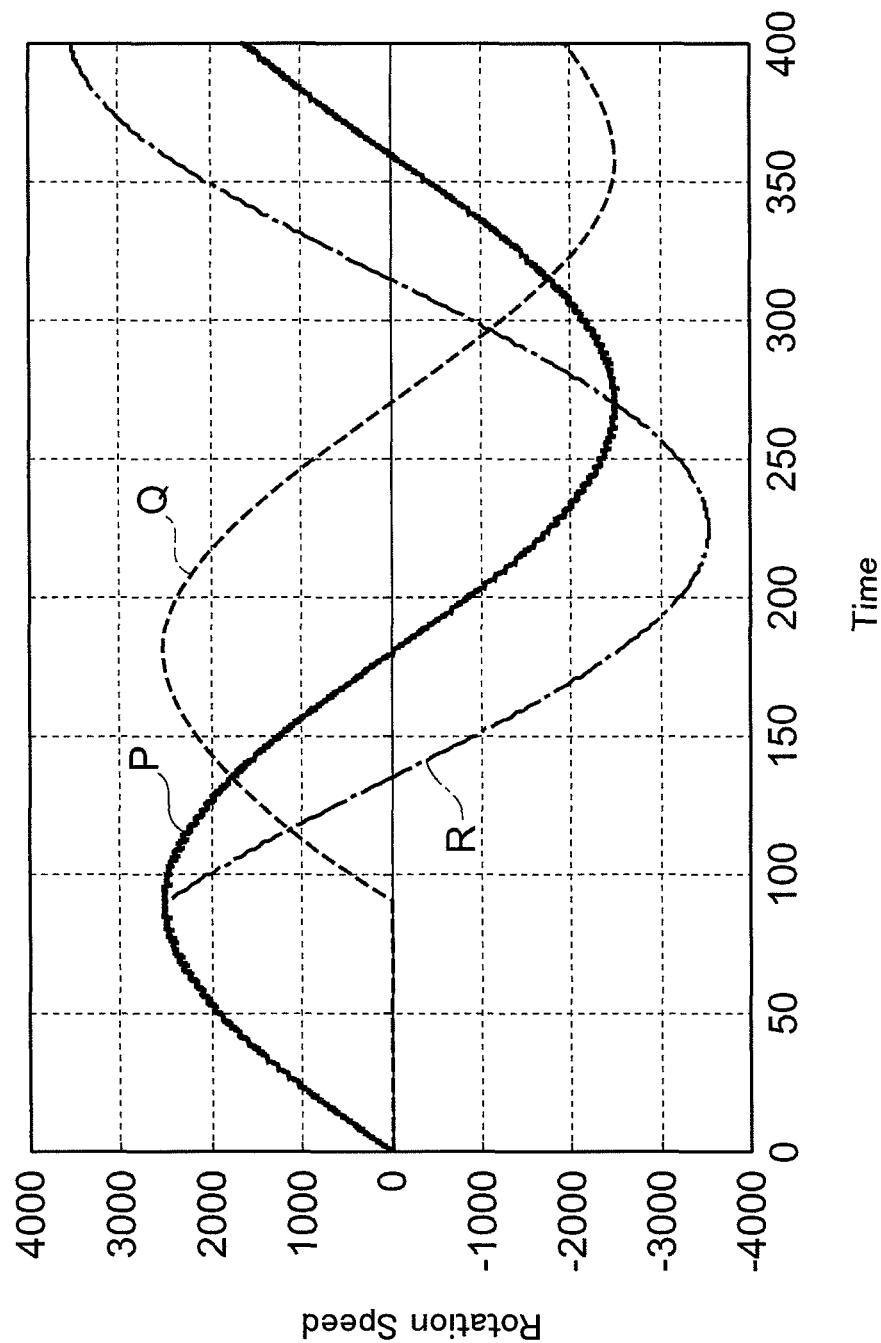
FIG. 5 is a graph showing one example of rotation speed deviation in a feedback control system based on the present target rotation speed and the actual rotation speed.

In the electric power generation system (engine to generator-motor), there is a large delay until the actual rotation responds to a drive command. For example, as shown in FIG. 5, there is a response delay time of several tens to several hundreds of milliseconds from when the drive command is output (refer to solid line P) to when the actual rotation speed varies (refer to broken line Q). In other words, the actual rotation speed is the result of a response to a drive command that was issued several tens to several hundreds of milliseconds earlier. Thus, in a feedback control system that compares the present command rotation speed with the present actual rotation speed, the response delay results in excessive or insufficient corrections (refer to the single-dashed line R). This causes the cargo handling assistance electric power to be generated more than necessary or less than necessary.

To cope with this problem, in the first embodiment, the deviation of the target engine rotation speed, which was stored in the memory 24 a predetermined time earlier, and the actual present generator-motor actual rotation speed is calculated. Then, the cargo handling assistance electric power is obtained in accordance with the rotation speed deviation. This absorbs the delay of the actual rotation in response to the drive command for the engine 2 and the generator-motor 3. Accordingly, response delays do not result in excessive or insufficient corrections. This prevents the generation of unnecessary cargo handling assistance electric power. Thus, the generator-motor 3 performs cargo handling assistance in a proper manner. This allows for a significant increase in the cargo handling capability of the forklift 1.

The actual rotation produced by the generator-motor 3 in response to a drive command is faster than the response of the actual rotation produced by the engine 2 in response to a drive command. Thus, for example, when the cargo handling assistance electric power is varied in a stepped manner, the sudden cargo handling assistance performed by the generator-motor 3 would result in the engine 2 producing rotation that is more than necessary. In the first embodiment, the cargo handling assistance electric power obtained by the assistance electric power setting unit 26 undergoes a grading process. This prevents excessive rotation produced by the engine 2.

The engine rotation speed stored in the memory 24 a predetermined time earlier is used as the feedback control rotation speed. Thus, when determining the feedback control rotation speed, a special calculation does not have to be performed. This is beneficial when, for example, the load applied to the lift cylinder 7 does not vary greatly.

FIG. 6 is a block diagram of a cargo handling controller according to a second embodiment of the present invention. FIG. 6 shows a functional block of the ECU 18 shown in FIG. 1. To avoid redundancy, like or same reference numerals are given to those components that are the same as the corresponding components of the first embodiment. Such components will not be described.

In FIG. 6, a cargo handling controller 30 of the second embodiment further includes a pressure sensor 31, which detects the pressure applied to the lift cylinder 7. The pressure sensor 31 allows for the detection of the cargo handling load. A weight sensor or the like that detects the weight of a cargo held on the fork may be used in lieu of the pressure sensor 31.

In addition to the function shown in FIG. 2, the ECU 18 includes a feedback control rotation speed setting unit 32. The feedback control rotation speed setting unit 32 sets a feedback control rotation speed based on the detection value of the pressure sensor 31, the target engine rotation speed obtained by the target engine rotation speed setting unit 22, and the target engine rotation speed stored in the memory 24. Then, the feedback control rotation speed setting unit 32 sends the feedback control rotation speed to the deviation calculation unit 25.

More specifically, the feedback control rotation speed setting unit 32 receives the present target engine rotation speed R1, which is obtained by the target engine rotation speed setting unit 22, and the target engine rotation speed R2, which was stored in the memory 24 a predetermined time earlier. Then, the feedback control rotation speed setting unit 32 calculates the feedback control rotation speed R from the equation shown below. In the equation, α represents a weighting coefficient of a predetermined time earlier target engine rotation speed R2.

$$R = (1-\alpha)R1 + \alpha R2$$

The weighting coefficient α ($0 < \alpha \leq 1$) is determined in accordance with the detection value of the pressure sensor 31. As the detection value of the pressure sensor 31 increases, that is, as the cargo handling load increases, the weighting coefficient α is set to be closer to 1.

The feedback control rotation speed setting unit 32 and the deviation calculation unit 25 form a deviation calculator that calculates the deviation of the feedback control rotation speed, which is determined from the target engine rotation speed stored in the memory a predetermined time earlier, and the rotation speed of the generator-motor, which is detected by the rotation speed detection unit.

When the cargo handling load is high, the delay time of the actual rotation in response to the drive command is long in the engine 2 and the generator-motor 3. Thus, the feedback control rotation speed R is set by increasing the ratio (weighting coefficient $\alpha$) of the predetermined time earlier target engine rotation speed R2. When the cargo handling load is low, the delay time of the actual rotation in response to the drive command is short in the engine 2 and the generator-motor 3. Thus, the feedback control rotation speed R is set by increasing the ratio of the present target engine rotation speed R1 (decreasing the weighting coefficient $\alpha$).

In this manner, the deviation of the feedback control rotation speed, which is in accordance with the cargo handling load, and the present actual motor rotation speed is calculated to obtain the cargo handling assistance electric power in accordance with the rotation speed deviation. Thus, regardless of the cargo handling load, delays in the actual rotation produced by the engine 2 and the generator-motor 3 in response to drive commands are absorbed. This allows for the cargo handling assistance to be performed by the generator-motor 3 in a further proper manner.

The present invention is not limited to the first and second embodiments. For example, the first and second embodiments assist the engine 2 in driving the pump 5 with the generator-motor 3 when the lift cylinder 7 lifts the fork. However, the present invention may also be applied to a cargo handling controller that assists cargo handling when tilting the fork forward or rearward or when driving another attachment (e.g., rotational clamp).

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A cargo handling controller for a cargo handling vehicle including an engine, a generator-motor, a pump arranged coaxially with the engine and the generator-motor, a cargo handling actuator driven by operational oil from the pump, and an operation unit that drives and operates the cargo handling actuator, the cargo handling controller comprising:

a rotation speed setting unit that obtains a target engine rotation speed in accordance with an operated amount of the operation unit;

an engine control unit that sends a drive signal that is in accordance with the target engine rotation speed to the engine;

a memory that stores the target engine rotation speed;

a rotation speed detection unit that detects an actual rotation speed of the generator-motor;

a deviation calculator that calculates a deviation of a feedback control rotation speed, which is determined from the target engine rotation speed stored in the memory a predetermined time earlier, and an actual rotation speed of the generator-motor, which is detected by the rotation speed detection unit;

an assistance amount setting unit that obtains a generator-motor assistance amount in accordance with the deviation; and a generator-motor control unit that sends a drive signal that is in accordance with the generator-motor assistance amount to the generator-motor, wherein the predetermined time corresponds to a delay of an actual rotation speed of the generator-motor in response to the drive signal sent to the engine.

2. The cargo handling controller according to claim 1, wherein the feedback control rotation speed is the target engine rotation speed stored in the memory a predetermined time earlier.

3. The cargo handling controller according to claim 1, wherein the deviation calculator includes a feedback control rotation speed setting unit that determines the feedback control rotation speed based on the target engine rotation speed stored in the memory a predetermined time earlier, a most recent target engine rotation speed obtained by the rotation speed setting unit, and the load applied to the cargo handling actuator.

4. The cargo handling controller according to claim 3, wherein the feedback control rotation speed setting unit uses the equation of $R=(1-\alpha)R1+\alpha R2$ to calculate a feedback control rotation speed R, where R1 represents the most recent target engine rotation speed, R2 represents the target engine speed stored in the memory a predetermined time earlier, and $\alpha$ represents a weighting coefficient determined in accordance with a load applied to the cargo handling actuator.

5. The cargo handling controller according to claim 4, wherein the weighting coefficient $\alpha$ becomes closer to 1 as the load applied to the cargo handling actuator increases.

6. The cargo handling controller according to claim 1, wherein the assistance amount setting unit includes a grading processor that performs a grading process on the generator-motor assistance amount, and the generator-motor control unit sends a drive signal in accordance with the generator-motor assistance amount that has undergone the grading process to the generator-motor.

* * * * *